United States Patent Office 3,532,255
Patented Oct. 6, 1970

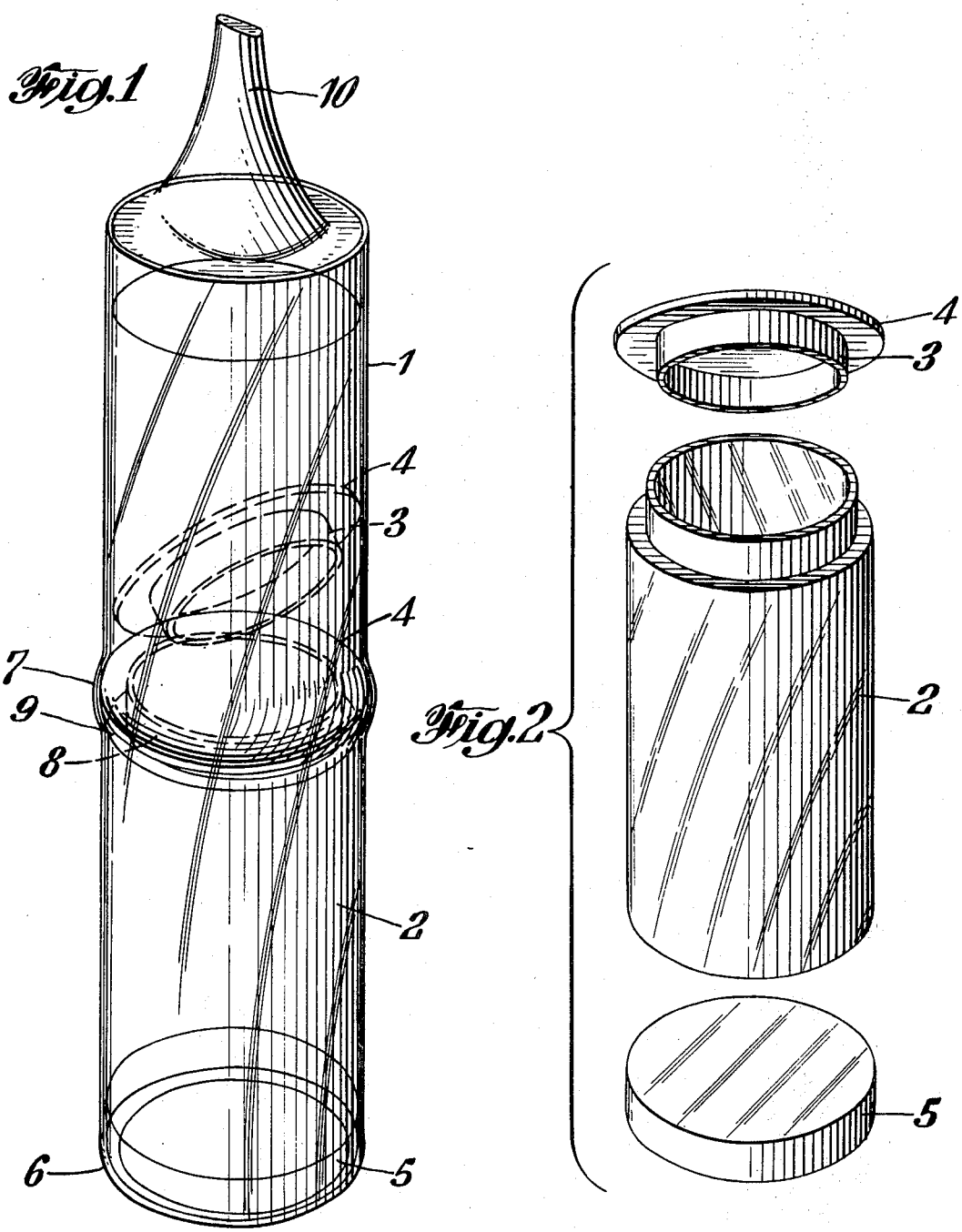

3,532,255
VALVE AND DISPENSING TUBE-CHILLING MECHANISM FOR REFRIGERATED BULK LIQUID DISPENSERS
Lannie F. Norris, Hot Springs, Ark., and Kenneth W. Mackenzie, Minneapolis, Minn., assignors to Norris Dispensers, Inc., Minneapolis, Minn., a corporation of Minnesota
Filed July 24, 1968, Ser. No. 747,253
Int. Cl. B67d 5/62
U.S. Cl. 222—146          8 Claims

ABSTRACT OF THE DISCLOSURE

Valve mechanism for controlling discharge from the flexible dispensing tube of refrigerated bulk liquid dispensers, which through inherent combination of parts maintains desired refrigeration temperatures for the liquid throughout and in the lower portion of said dispensing tube, overcoming a serious problem in conventional bulk liquid dispensing apparatus.

Said assembly further comprises a thermal channel or heat transmission surface in constant contact with the circumference of said tube adjacent and above the valve portion.

A further feature which cooperates to the unitary results is the interposition of a heat insulated sector between the thermal mass and the operating medium of the valve.

---

This invention relates generally to refrigerated, bulk-liquid-dispensing apparatus widely used in restaurants, hotels and homes, and more particularly relates to a novel and highly efficient mechanism for constantly maintaining throughout the height of the elongated conventional dispensing tube, including the closed or pinched portion thereof, a desirable refrigeration temperature to positively assure against contamination or bacteria in the milk or other liquid to be dispensed at the point of operation of the valve and throughout the entire dispensing tube and interior of the bulk container.

Refrigerated bulk-liquid dispensing apparatus of the general type of the instant application is disclosed in our now expired United States Letters Patent No. 2,601,319 and in our Pat. No. 2,808,185 issued Oct. 1, 1957, employing generally a refrigerated cabinet within which one or more bulk-liquid containers are mounted, said container having connected with the lower and forward sump portion thereof a sterilized, disposable, flexible dispensing tube, the lower end of which is passed through a pinch-cock valve device mounted in said sump and controllable from the exterior of the cabinet. Dispensing apparatus of our previous patented constructions has received wide and favorable acceptance in commercial markets.

Said Pat. No. 2,808,185 provided a distinct and valuable step of advance in the art in that its construction prevented downward flow of moisture condensation exteriorly of the dispensing tube and to the delivery end thereof. It also provided an improved and insulated well and abutment for the operating element of the pinch-cock valve which substantially bettered temperatures produced in the lower portion of the tube due to influence of ambient temperatures at the outside and forward portion of the cabinet.

In the structure of the instant invention and in those of the previous herein identified patents owned by our assignee Norris Dispensers, Inc., a refrigeration unit has usually been contained in another portion of the refrigeration chamber cabinet, usually in the lower portion. Recently implemented national health safety codes and standards have set very strict regulations for the temperature at which bulk container milk must be maintained including requisite temperatures of milk in the dispensing tubes up and to the very point of discharge.

Even with the improved construction of the second patent identified herein, serious difficulty has arisen in maintaining the very small amount of milk or other beverage in the dispensing tube, just about the discharge valve, as well as the temperature of the valve body and parts, at proper refrigeration temperatures for health and taste purposes. The dispensing tube has been subjected to warming influence from the atmosphere or ambient temperature surrounding the cabinet. In such structure heat was transmitted from the rather large operating handle at the exterior of the cabinet into the valve body per se and the pinch-cock element at the lower end of the general valve structure. No specific means for chilling or dissipating heat at the critical points of valve closure and adjacent portion of the dispensing tube were provided.

Numerous attempts, including even additional and forced circulation of the refrigerated air in the cabinet about the valve body and lower end of the dispensing tube have been attempted, all without successfully accomplishing the desired results in solving the said problem.

It is a generally object of our invention to provide simple and highly efficient chilling and heat-dissipating mechanism combined with the general conventional structure of bulk-liquid-dispensing apparatus having a refrigerated chamber, a flexible and disposable delivery tube and pinch-cock valve which without addition of added refrigeration means or elements, will chill the valve member and adjacent portions of the delivery tube to desired refrigeration temperatures, and dissipate and insulate external heat from the ambient temperatures to the delivery tube and valve parts.

A further object is the provision in close combination with the manually operated pinchcock valve structure per se, and its associated parts and abutment mechanism which without addition of refrigeration facilities beyond the cool temperatures and air circulation within the conventional refrigerator cabinet, will rapidly dissipate heat normally transmitted to the valve closed portion of the delivery tube and pinchcock valve parts, while insulating those parts from any transmission of air from ambient exterior temperatures.

More specifically our invention comprises the discovery of the employment of a thermal, heat-dissipating mass in the body of the pinchcock valve member, so constituted and related with the adjacent and lower portion of the liquid delivery tube as to rapidly dissipate heat and chill the portion of the tube which is normally closed or depressed until discharge of liquid.

The chilling temperature of the thermal mass is attained by its relation to the normal convection or other cold air currents in the sump of the refrigerator cabinet without addition or requirement of added cooling coils or refrigeration facilities.

The foregoing and other objects will be more apparent from the following description made in connection with the accompanying drawings, wherein like reference characters refer to similar parts throughout the several views and in which:

FIG. 1 is a vertical cross section through the lower portion of a refrigerated cabinet containing a bulk liquid container and conventional type of flexible delivery tube wherein an embodiment of our novel and improved mechanism is operatively applied;

FIG. 2 is a front elevation showing our novel thermal mass in pinchcock valve structure mounting well and its adapted to be opened by snipping of the tip of said nozzle.

3. A dual compartmented container according to claim 2 wherein the end of the plastic tube is sealed around the base plug by the application of heat.

4. A dual compartmented container according to claim 1 wherein the rigid vial is constructed of glass and has dimensions such that it can be inserted into the outer cylinder in a pressed fit relation.

5. A dual compartmented container according to claim 4 wherein the stopper is constructed of a semi-rigid plastic and has a diameter which is slightly greater than the diameter of the vial.

6. A dual compartmented container according to claim 1 wherein the vial is sealed by an aluminum coating at the interface of the stopper and the neck portion.

7. A dual compartmented container having means for intermixing the contents of the compartments, said container comprising:
- (A) a flexible plastic tube having a rigid base plug inserted in one end, said tube being heat sealed about the base plug and having a plastic applicator nozzle integrally molded into the other end, the container being adapted to be opened by snipping off the tip of said nozzle;
- (B) a glass vial inserted into the plastic tube in a pressed fit relation and sealed therein, said vial having a reduced neck portion; and
- (C) a semi-rigid, plastic, flanged stopper having a diameter slightly larger than the diameter of the vial, said stopper fitting into the reduced neck portion of the vial in a sealed relation and being additionally sealed by an aluminum coating at the interface of the stopper and vial, the flange of said stopper engaging the inner wall of the flexible plastic tube in a sealed relation thereby dividing the container into two compartments, said stopper being adapted to be removed from the neck portion of the vial by exterior manipulation through the flexible plastic tube, thereby allowing the contents of each compartment to be intermixed.

References Cited

UNITED STATES PATENTS

| 2,925,719 | 2/1960 | Robbins et al. | |
| 3,068,154 | 12/1962 | Majors. | |
| 3,221,917 | 12/1965 | De Santo et al. | 222—94 X |
| 3,458,076 | 7/1969 | Babcock | 206—47 X |

ROBERT B. REEVES, Primary Examiner

N. L. STACK, Jr., Assistant Examiner

U.S. Cl. X.R.

206—47 ated dispensing cabinet. Through convection air currents, or other circulation of the chilled air within the refrigerating chamber, the lowest temperature of the moving air and convection currents is found in sump X. These air currents directly impinge against the thickened thermal mass 12 of the valve body rapidly dissipating heat from said thermal mass and chilling that mass to relatively low temperatures. Thus the temperature of the integral thermal mass 12 throughout the volume thereof has unexpectedly been found to be maintained at at least the average temperature of the circulating air within the refrigerated chamber normally below 41° F. The thermal mass or body 12 is in direct contact with a substantial zone and portion of the periphery of the depending dispensing tube 10 closely adjacent the collapsed end thereof. Specifically the thermal channel 12x engages approximately half, of the periphery of the dispensing tube 10 from a point just above the pinch element E to the top of the thermal mass 12. Thus, heat accumulating in the lower portion of the dispensing tube 10 is directly transmitted to the thermal mass and is continuously dissipated from the thermal mass into the impinging air currents which circulate in the lower and cooler sump portion X of the refrigerated chamber.

The cooperation of the heat insulating sector 13 to substantially prevent transmission of ambient outside temperatures through the handle to the thermal mass has importance in the overall functioning of our improved structure.

It will be understood that the valve structure disclosed attains these important improved results without requiring any additional refrigerating apparatus used in conjunction with the refrigerating chamber. The structure may be readily substituted for the pinchcock valve structure of bulk liquid dispensers of the structure disclosed in Pat No. 2,808,185 and does not result in appreciably lessening the temperature at various heights in the refrigerator cabinet.

Careful tests of our improved structure have been made to determine internal temperatures of liquid within the dispensing tube at various levels starting at the lowermost and including temperature tests at various levels in the bulk tank. These tests have shown that proper refrigeration temperatures within a range of from 38° to 41° F. have been obtained on all liquid standing in the tube, including temperature tests just above the pinchcock valve element.

It will of course be understood that various changes may be made in the form, details and arrangement of parts including the shape of the pivoted thermal mass.

What is claimed is:

1. In combination with a bulk liquid dispenser having a refrigeration chamber, a bulk liquid container mounted therein and provided with a depending, flexible and resilient dispensing tube communicating with the lower portion thereof, and a heat-insulated sump formed in a lower portion of said refrigeration chamber through which said tube extends,
    those improvements for valving the lower portion of said tube and for assuring refrigeration temperature to the contents of said tube including the valved portion thereof which comprise:
    a valve assembly having a body comprising a thermal mass heat-insulated in said sump for receiving impingement of chilled air currents from said refrigeration chamber, said body having a shiftable valve element related with the lower portion of said tube for normally closing off the flow of liquid from said tube and for opening said tube for discharge subject to voluntary control of an operator,
    said thermal mass being in heat-transmissive contact with a longitudinal portion of the circumference of said tube adjacent said valve element, and
    an operating element for said valve element extending externally of said refrigeration cabinet.

2. The structure set forth in claim 1 further characterized by
    a heat insulating element interposed between said thermal mass and said valve operating element.

3. The structure set forth in claim 1 wherein said thermal mass is mounted for oscillation and has a protruding pinchcock element for compressing said tube, and
    a well mounted in said sump having an abutment wall constituting a valve seat for said protruding element and tube.

4. The structure set forth in claim 1 wherein said thermal mass has a medially enlarged cross sectional shape generally disposed transversely of said sump.

5. The structure set forth in claim 4 further characterized by said thermal mass having outwardly extending aligned horizontal trunnions journaled in seats provided by the interior wall of said sump, and
    said mass carrying a protruding pinchcock valve element engaging said dispensing tube.

6. The structure set forth in claim 4 further characterized by said thermal mass having an elongated, generally horizontal portion disposed transversely in said sump, and having an upstanding channeled portion contoured and positioned to normally contact the lower portion of said dispensing tube immediate said valve element,
    said last mentioned portion terminating in a protruding pinch valve element.

7. In combination with a bulk liquid dispenser having a refrigeration chamber, a bulk liquid container mounted therein and provided with a depending flexible and resilient dispensing tube communicating with the lower portion thereof, and a sump formed in the lower portion of said refrigeration chamber through which said tube extends, convection air currents in operation chilling said sump to a temperature somewhat below the average height temperature in said refrigeration chamber,
    those improvements for valving the lower portion of said tube and for assuring refrigeration temperature to the contents of said tube directly above the valved portion thereof which comprise,
    a heat-insulating well mounted in said sump,
    a valve assembly having a body comprising a thermal mass wholly mounted in said well for receiving impingement of chilled air currents from said refrigeration chamber, said body having an upwardly extending channel therein conforming in shape to approximately one half of the periphery of said dispensing tube and disposed for operation in contact with a substantial portion of said tube extending directly upward from the valving portion of said tube to transmissively receive heat from said tube-portion,
    said valve structure including a shiftable pinchcock element for normally collapsing said tube near its lower end and an operating element connected with said shiftable pinch element and extending externally of said cabinet for controlling operation of said pinch element.

8. The structure and combination set forth in claim 7 and said thermal mass having a built up central portion, heat-transmissively communicating with said channel.

References Cited

UNITED STATES PATENTS

| | | | |
|---|---|---|---|
| 2,785,836 | 3/1957 | Smith et al. | 222—146 |
| 2,808,185 | 10/1957 | Norris et al. | 251—9 X |
| 3,445,039 | 5/1969 | Brodsky et al. | 222—183 X |

STANLEY H. TOLLBERG, Primary Examiner

H. S. LANE, Assistant Examiner

U.S. Cl. X.R.

251—9